US006092015A

United States Patent [19]

Takahashi et al.

[11] Patent Number: 6,092,015

[45] Date of Patent: *Jul. 18, 2000

[54] COMBUSTION STATE DETECTING APPARATUS FOR AN INTERNAL-COMBUSTION ENGINE

[75] Inventors: Yasuhiro Takahashi; Wataru Fukui, both of Tokyo, Japan

[73] Assignee: Mitsubishi Denki Kabushiki Kaisha, Tokyo, Japan

[ * ] Notice: This patent is subject to a terminal disclaimer.

[21] Appl. No.: 08/891,035

[22] Filed: Jul. 10, 1997

[30] Foreign Application Priority Data

Feb. 18, 1997 [JP] Japan .................................. 9-033966

[51] Int. Cl.$^7$ .............................. G06G 7/70; G06F 19/00

[52] U.S. Cl. .......................... 701/101; 701/102; 701/104; 701/105; 123/481; 123/406.34; 123/406.37; 73/117.3; 73/116; 73/115; 73/35.08

[58] Field of Search .................................. 701/101, 102, 701/103, 104, 105, 110; 123/406.34, 406.37, 406.39, 406.21, 406.27, 406.14, 406.16, 406.65, 435, 436, 630, 635, 643, 647, 610, 613; 70/35.08, 35.03, 35.01, 115, 116, 117.3, 118.1; 324/380, 399, 402, 459

[56] References Cited

U.S. PATENT DOCUMENTS

| | | | |
|---|---|---|---|
| 4,788,957 | 12/1988 | Komurasaki | 123/425 |
| 4,967,710 | 11/1990 | Komurasaki et al. | 123/425 |
| 5,207,200 | 5/1993 | Iwata | 123/425 |
| 5,230,240 | 7/1993 | Ohsawa | 73/116 |
| 5,239,973 | 8/1993 | Murata et al. | 123/635 |
| 5,272,914 | 12/1993 | Murata et al. | 73/116 |
| 5,444,375 | 8/1995 | Ohsawa et al. | 324/380 |
| 5,694,900 | 12/1997 | Morita et al. | 123/630 |
| 5,701,876 | 12/1997 | Morita et al. | 123/630 |
| 5,747,670 | 5/1998 | Takahashi et al. | 73/35.08 |
| 5,755,206 | 5/1998 | Takahashi et al. | 123/425 |
| 5,785,020 | 7/1998 | Takahashi et al. | 123/425 |

*Primary Examiner*—Jacques H. Louis-Jacques
*Attorney, Agent, or Firm*—Sughue, Mion, Zinn, Macpeak & Seas, PLLC

[57] ABSTRACT

A combustion state detecting apparatus for an internal-combustion engine improves the signal-to-noise ratio of an ionic pulse signal to achieve good interfacing characteristic, high detection accuracy, and high control reliability without adding to cost. An electronic control unit (2A) which detects the combustion state in a spark plug according to an ionic pulse signal (Gi) includes: an edge detecting circuit (36) for detecting an end edge of an ionic pulse contained in the ionic pulse signal in a detection zone from a second reference crank angle to a first reference crank angle; a level detecting circuit (37) for detecting the level of the ionic pulse signal at the first reference crank angle; and a circuit (38) for determining the combustion state of the internal-combustion engine according to a detection result (Ni) received from the edge detecting circuit and a detection result (Li) received from the level detecting circuit. Thus, an ionic current detection signal can be pulsed using a simple circuit configuration, and the simple determining logic is used to reduce the load on the arithmetic processor of the electronic control unit.

5 Claims, 8 Drawing Sheets

COMBUSTION STATE DETECTING APPARATUS FOR AN INTERNAL-COMBUSTION ENGINE

BACKGROUND OF THE INVENTION

1. Field of the Invention

The present invention relates to a combustion state detecting apparatus for an internal-combustion engine, which apparatus controls ignition timing and the amount of fuel injection by detecting the combustion state of the internal-combustion engine by detecting the changes in the quantity of ions which are produced at the time of combustion in the internal-combustion engine and, more particularly, to a combustion state detecting apparatus for an internal-combustion engine, which apparatus is capable of detecting a misfire with high reliability to achieve optimum ignition timing without adding load to an electronic control unit, i.e. a microcomputer.

2. Description of Related Art

Generally, in an internal-combustion engine, the air and fuel, i.e. a fuel-air mixture, which has been introduced into the combustion chamber of each cylinder is compressed as a piston moves up, and high voltage is applied to a spark plug in the combustion chamber to generate an electric spark at the spark plug so as to burn the compressed fuel-air mixture; the explosive energy produced at that time is taken out as the force which pushes the piston down and it is converted to a rotary output.

When the combustion takes place in the combustion chamber in the foregoing combustion and expansion stroke, the molecules in the combustion chamber are ionized. Therefore, applying high voltage to the electrodes for detecting ionic current, which are installed in the combustion chamber, immediately after the combustion and expansion stroke causes ions with electric charges to move in the form of ionic current.

It is known that the ionic current sensitively reacts to the combustion state in the combustion chamber with a resultant change, making it possible to determine a combustion state such as a misfire or knocking in a cylinder by detecting the state of the ionic current, including the peak value thereof.

Based on the above, there has been proposed an apparatus which employs a spark plug as the electrodes for detecting ionic current to detect the combustion state, i.e. a misfire, of an internal-combustion engine according to the amount of ionic current detected immediately following ignition as described, for example, in Japanese Unexamined Patent Publication No. 2-104978.

FIG. 8 is a block diagram that schematically illustrates a conventional combustion state detecting apparatus for an internal-combustion engine; it shows an example wherein high voltage is distributed to spark plugs 8*a* through 8*d* of each cylinder via a distributor 7.

FIG. 9 is a timing chart illustrative of the operational waveforms of the voltage signals in FIG. 8; it shows the waveforms of ignition signal P, detection signal Ei of ionic current i, and ionic pulse Fi which are observed when normal combustion takes place.

In FIG. 8, a crankshaft of an internal-combustion engine, i.e. an engine, not shown, is provided with a crank angle sensor 1; the crank angle sensor 1 issues a crank angle signal SGT composed of pulses corresponding to engine speed.

The crank angle signal sGT is supplied to an electronic control unit (ECU) 2 constituted by a microcomputer and employed for various types of control arithmetic operations.

Each pulse edge of the crank angle signal SGT indicates the crank angle reference position of each cylinder, not shown, of the internal-combustion engine.

As shown in FIG. 9, for example, the rise edge of the crank angle signal SGT corresponds to a first reference position B75 degrees, which is 75 degrees before reaching compression upper dead center TDC and which provides the control reference for various control parameters including ignition timing of the internal-combustion engine, while the fall edge thereof corresponds to a second reference position B5 degrees in the vicinity of TDC, i.e. the initial ignition timing at the time of cranking.

The ECU 2 issues an ignition signal P for a power transistor TR driving an ignition coil 4, a fuel injection signal Q for an injector 5 of each cylinder, and driving signals for various actuators 6 including a throttle valve and ISC valve in accordance with the crank angle signal SGT received from the crank angle sensor 1 and the operational information received from various sensors 3 including a well-known intake sensor and a throttle opening sensor.

The ignition signal P issued from the ECU 2 is applied to the base of the power transistor TR to turn ON/OFF the power transistor TR.

The power transistor TR cuts off the supply of primary current i1 flowing into a primary winding 4*a* of the ignition coil 4 to boost primary voltage V1 so as to generate secondary voltage V2 of high voltage, e.g. a few tens of kilovolts, for ignition from a secondary winding 4*b* of the ignition coil 4.

A distributor 7 connected to the output terminal of the secondary winding 4*b* distributes and applies the secondary voltage V2 to spark plugs 8*a* through 8*d* in each cylinder so as to generate discharge sparks in the combustion chamber of the cylinder under ignition control, thereby burning a fuel-air mixture.

A series circuit comprised of a diode D1, a current limiting resistor R1, and current limiting zener diode DZ and diode D2 is provided between one end of the primary winding 4*a* and the ground to constitute a charging path for the biasing power supply, i.e. a capacitor to be discussed later, for detecting ionic current.

A capacitor 9 connected in parallel to both ends of the zener diode DZ is charged to a predetermined voltage by charging current in order to function as the power supply for detecting ionic current; it discharges immediately after ignition control to let ionic current i flow.

Diodes 11*a* through 11*d* provided between one end of the capacitor 9 and one end of the spark plugs 8*a* through 8*d*, and a resistor R2 inserted between the other end of the capacitor 9 and the ground make up, together with the capacitor 9, an ionic current detecting circuit through which the ionic current i flows.

The resistor R2 converts the ionic current i to a voltage to produce an ionic current detection signal Ei which is supplied to the ECU 2.

A pulse generating circuit 20 compares the ionic current detection signal Ei with a reference level Er shown in FIG. 9 to waveform-shape it into an ionic pulse signal Fi which includes the ionic pulse FP and supplies the ionic pulse signal Fi to the ECU 2.

The ECU 2 computes the control parameters for the internal-combustion engine and also detects the combustion state at the spark plugs 8*a* through 8*d* according to the ionic current detection signal Ei or the ionic pulse signal Fi to correct the control parameters.

Referring now to FIG. 9, the operation of the conventional combustion state detecting apparatus for an internal-combustion engine shown in FIG. 8 will be described.

First, the crank angle sensor 1 outputs the crank angle signal SGT according to the rotation of the internal-combustion engine. The ECU 2 outputs various driving signals including the ignition signal P for turning ON/OFF the power transistor TR according to the crank angle signal SGT indicative of the crank angle position of each cylinder and the operational state signals received from various sensors 3.

The power transistor TR turns ON when the ignition signal P is at high level and it allows the primary current i1 to flow through the primary winding 4*a* of the ignition coil 4; it cuts off the primary current i1 to the ignition coil 4 when the ignition signal P is switched from high to low level.

At this time, the primary voltage V1 is generated at the primary winding 4*a* due to counter electromotive voltage, thereby charging the capacitor 9 through a charging current path composed of the diode D1, the resistor R1, and the diode D2.

The charging of the capacitor 9 is completed when the charging voltage of the capacitor 9 becomes equal to the reverse breakdown voltage of the zener diode DZ.

When the primary voltage V1 appears at the primary winding 4*a*, the secondary winding 4*b* of the ignition coil 4 develops the secondary voltage V2 of a few tens of kilovolts; the secondary voltage V2 is applied to the spark plugs 8*a* through 8*d* of each cylinder via the distributor 7 so as to cause spark discharge to burn the fuel-air mixture.

When the fuel-air mixture burns, ions are produced in the combustion chamber of the cylinder, so that the ionic current i flows, the charging voltage of the capacitor 9 being the power supply.

For example, when the fuel-air mixture burns at the spark plug 8*a*, the ionic current i flows along a path composed of the capacitor 9, the diode 11*a*, the spark plug 8*a*, the ground, the resistor R2, and the capacitor 9 in the order in which they are listed. At this time, the resistor R2 converts the ionic current i to voltage so as to supply it as the ionic current detection signal Ei to the ECU 2.

The pulse generating circuit 20 applies the ionic current detection signal Ei as the ionic pulse signal Fi to the ECU 2.

The ECU 2 determines the combustion state in accordance with the ionic current detection signal Ei and the ionic pulse signal Fi; if, for example, it determines that a misfire has happened, then it cuts off the supply of fuel, or if it determines that knocking has occurred, then it delays the ignition timing to restrain the knocking.

Thus, the combustion state is reflected on the control parameters, namely, the ignition signal P and the fuel injection signal Q, to optimize the ignition timing or the control amount of the fuel injection, etc. so as to provide optimum, maximum engine output torque.

However, at the rise timing and the fall timing of the ignition signal P, i.e. at the time of energizing and de-energizing the ignition coil 4, an instantaneous noise signal En shown in FIG. 9 is superimposed on the ionic current detection signal Ei.

The noise signal En directly turns into a noise pulse Fn and it is supplied as the ionic pulse signal Fi to the ECU 2.

Therefore, the ECU 2 may erroneously determine the combustion state because of the noise pulse Fn.

Thus, the conventional combustion state detecting apparatus for an internal-combustion engine has been posing a problem in that, although it determines the combustion state according to the ionic current i, it provides no effective measures against the noise signal En and the like superimposed on the ionic current detection signal Ei at the time of ignition control, making it impossible to accurately detect the combustion state in the internal-combustion engine.

There has been another problem in that setting an effective period of the ionic pulse signal Fi during the arithmetic processing performed by the ECU 2 adds load to the ECU 2 implementing the arithmetic processing, thus adversely affecting the controlling operation, which is the major function of the ECU 2.

SUMMARY OF THE INVENTION

The present invention has been made with a view toward solving the problems described above, and it is an object of the invention to provide a combustion state detecting apparatus for an internal-combustion engine, which apparatus employs a simple circuit configuration to turn an ionic current detection signal into a pulse and also employs a simple determining logic to reduce the load on an ECU when implement arithmetic processing, thereby achieving improved signal-to-noise ratio of the ionic pulse signal to ensure good interfacing characteristic, high detection accuracy, and high control reliability without adding to cost.

To this end, according to the present invention, there is provided a combustion state detection apparatus for an internal-combustion engine, which apparatus is equipped with: an ignition coil for generating high voltage for ignition; a spark plug for igniting a fuel-air mixture in a cylinder of the internal-combustion engine by discharging under the application of the high voltage for ignition; an ionic current detecting circuit which detects, as an ionic current detection signal, the ionic current corresponding to the quantity of ions produced in the cylinder immediately after the combustion of the fuel-air mixture; a pulse generating circuit which waveform-shapes the ionic current detection signal into an ionic pulse signal; a crank angle sensor which generates a crank angle signal indicative of first and second reference crank angles of the cylinder; and an ECU which generates an ignition signal for energizing or de-energizing the ignition coil according to the crank angle signal and which detects the combustion state in the spark plug according to the ionic pulse signal; wherein the first reference crank angle corresponds to a control reference for controlling the ignition of the cylinder, while the second reference crank angle corresponds to the vicinity of the compression upper dead center of the cylinder; and the ECU includes edge detecting circuit for detecting an end edge of an ionic pulse included in the ionic pulse signal in the detection zone ranging from the second reference crank angle to the first reference crank angle, level detecting circuit for detecting the level of the ionic pulse signal at the first reference crank angle, and determining means which determines the combustion state of the internal-combustion engine according to the detection results received from the edge detecting circuit and the level detecting circuit.

In a preferred form of the present invention, the determining circuit of the combustion state detecting apparatus for an internal-combustion engine determines that the combustion has taken place at the spark plug when the end edge has been detected in the detection zone, or when the level of the ionic pulse signal at the first reference crank angle is a first level indicative of the presence of an ionic pulse; it determines that a misfire has taken place at the spark plug if the end edge has not been detected in the detection zone and the level of the ionic pulse signal at the first reference crank angle is a second level indicative of the absence of an ionic pulse.

In another preferred form of the present invention, the determining circuit of the combustion state detecting apparatus for an internal-combustion engine includes a counter which counts the number of times misfires have been determined until a predetermined number of control cycles is reached, and it decides that an abnormal misfire state has occurred when the count by the counter reaches a predetermined value and displays the failure.

In yet another preferred form of the present invention, the pulse generating circuit of the combustion state detecting apparatus for an internal-combustion engine includes: a comparator circuit for comparing an ionic current detection signal with a reference level; and a timer processing circuit for removing noises from the ionic current detection signal.

In still another preferred form of the present invention, the first reference crank angle of the combustion state detecting apparatus for an internal-combustion engine is set to a value lying between B90 degrees and B60 degrees of each cylinder, and the second reference crank angle is set to a value lying between B10 degrees and A10 degrees of each cylinder.

DESCRIPTION OF THE PREFERRED EMBODIMENTS

First Embodiment

A first embodiment of the present invention will be described in conjunction with accompanying drawings.

Figure 1:
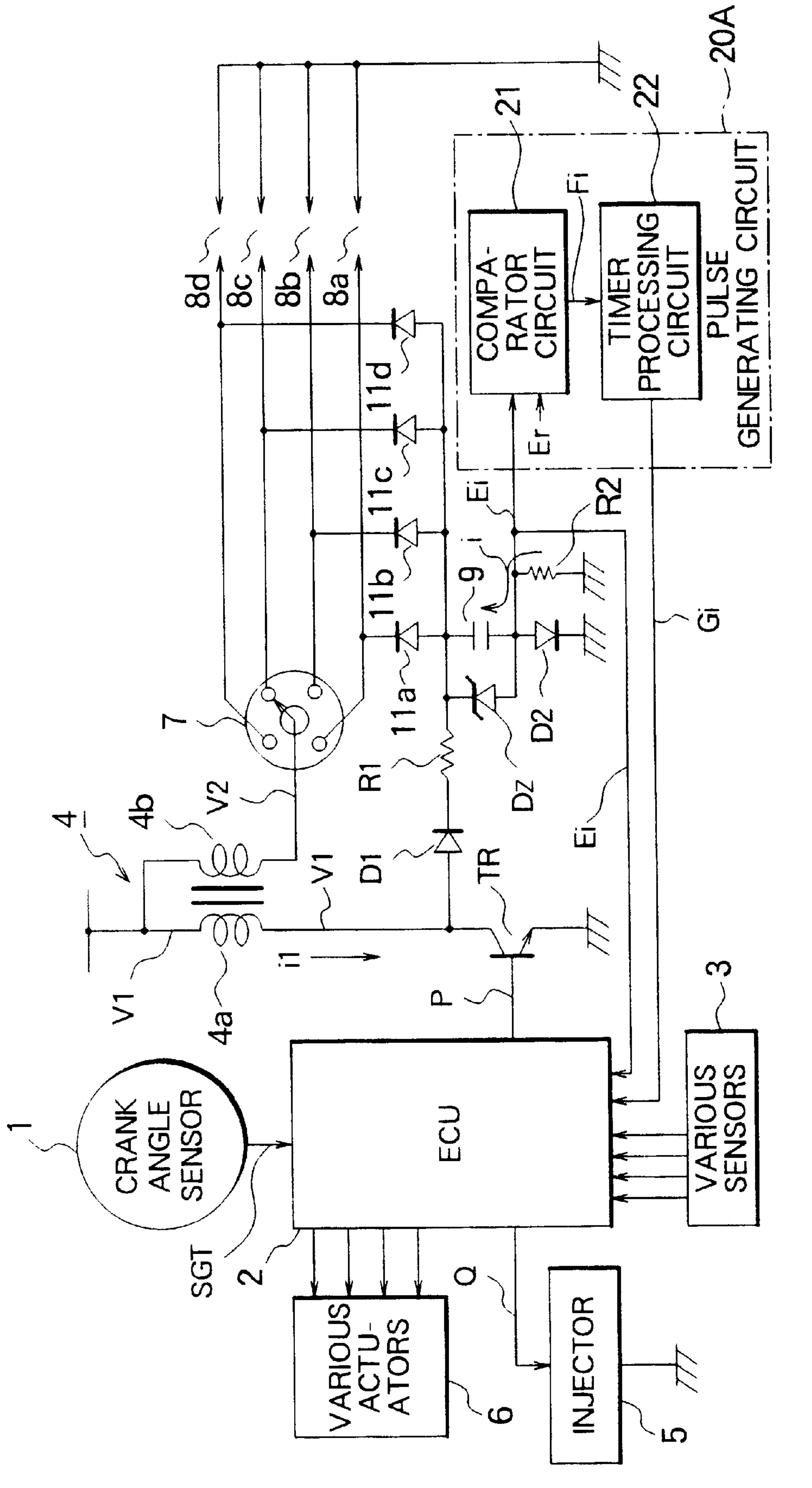
FIG. 1 is a block diagram schematically showing a first embodiment of the present invention.
Figure 2:
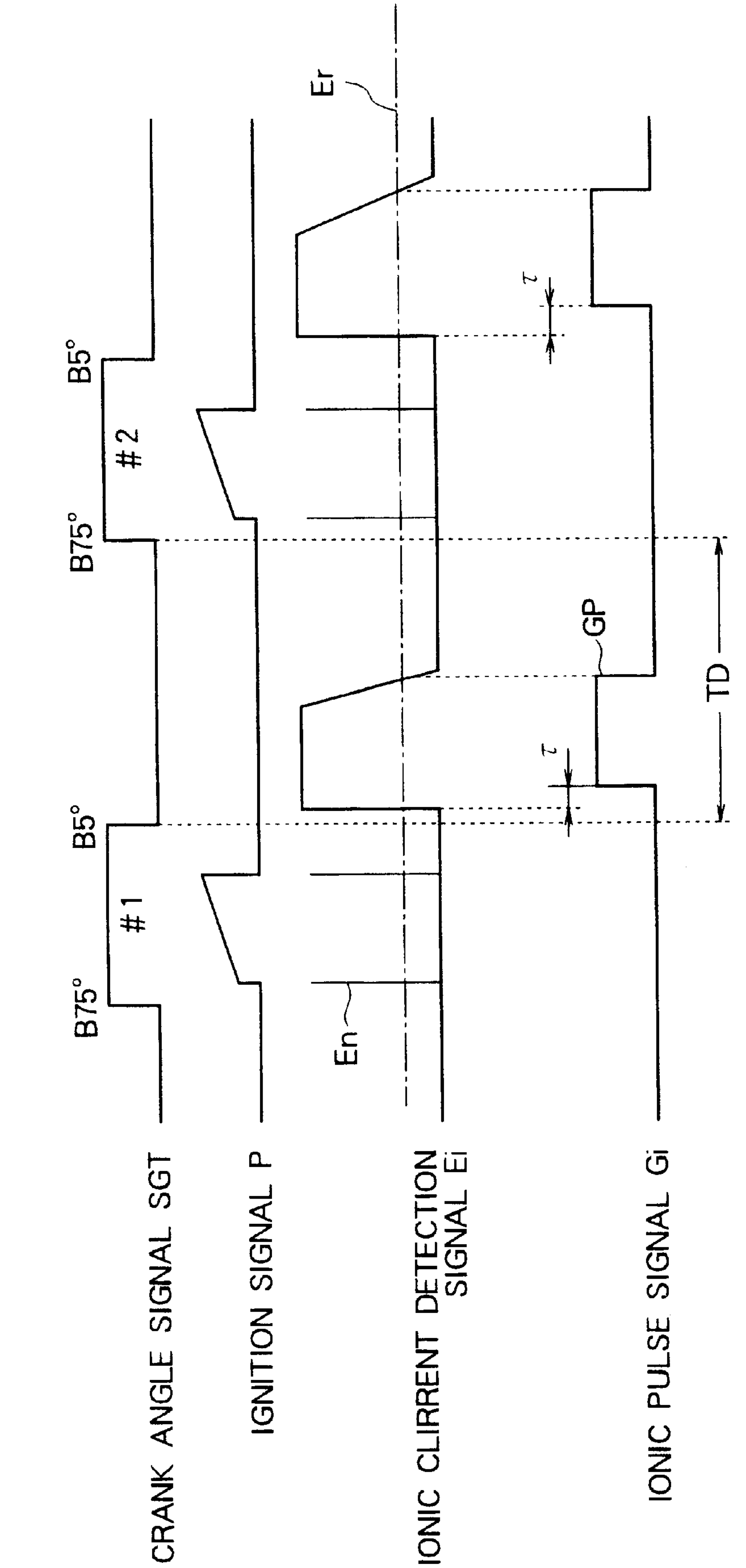
FIG. 2 is a timing chart for describing the operation of the first embodiment of the invention.

FIG. 1 is a block diagram schematically showing the basic configuration of the first embodiment of the invention; FIG. 2 is a timing chart illustrating the operational waveforms of respective voltage signals in FIG. 1.

Figure 8:
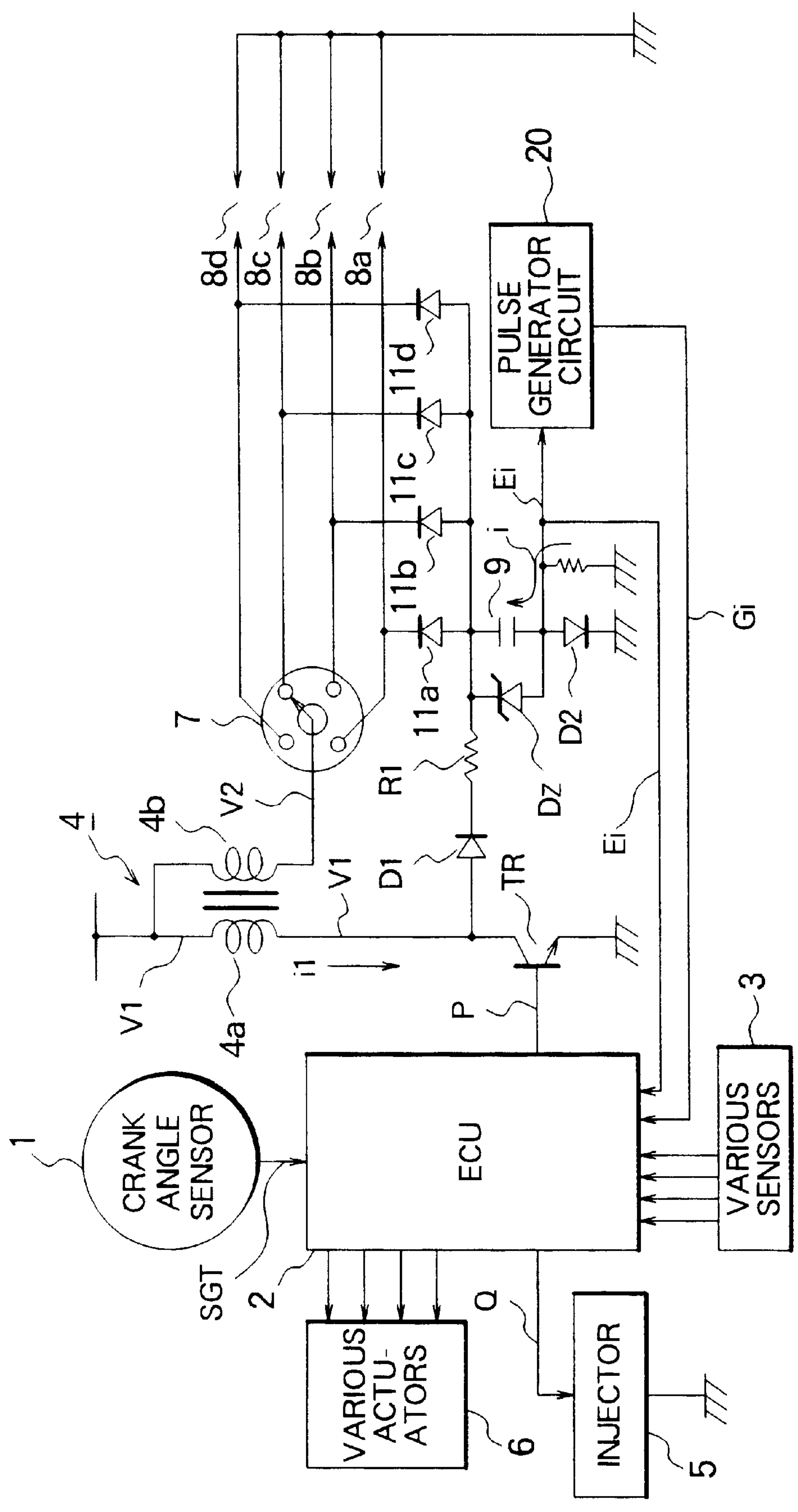
FIG. 8 is a block diagram schematically showing a conventional combustion state detecting apparatus for an internal-combustion engine.
Figure 9:
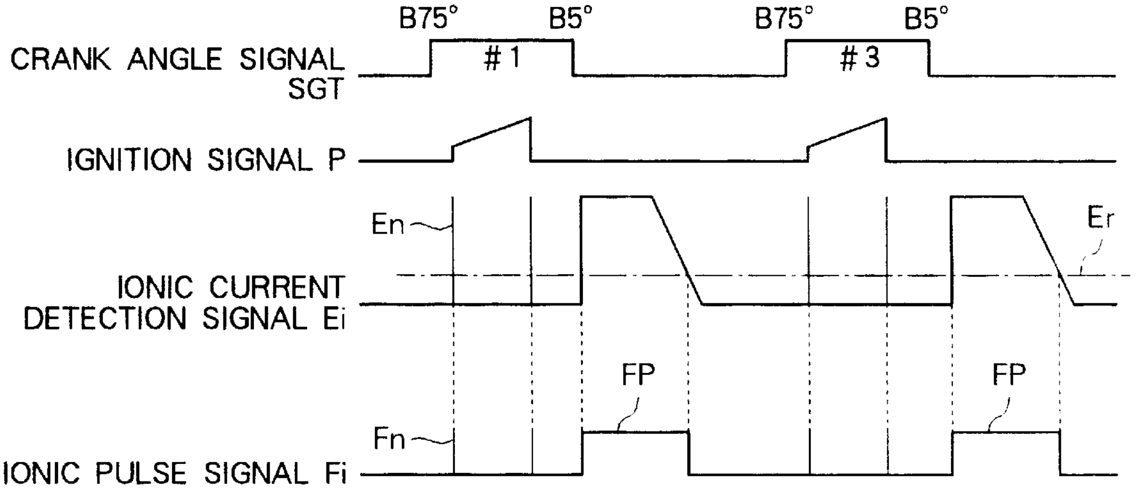
FIG. 9 is a timing chart for describing the operation of the conventional combustion state detecting apparatus for an internal-combustion engine.

In the drawings, like components as those shown in FIG. 8 and FIG. 9 will be assigned like reference numerals and the detailed description thereof will be omitted.

In FIG. 1, a pulse generating circuit 20A is connected to one end of a resistor R2 constituting an ionic current detecting circuit.

The pulse generating circuit 20A includes a comparator circuit 21 for pulsing an ionic current detection signal Ei, and a timer processing circuit 22 for removing a noise signal Fn shown in FIG. 9 from an ionic pulse signal Fi received from the comparator 21; it generates an ionic pulse signal Gi based on the ionic current detection signal Ei.

The comparator circuit 21 compares the ionic current detection signal Ei with a predetermined reference level Er shown in FIG. 2, and it outputs the ionic pulse Fi shown in FIG. 9 when the ionic current detection signal Ei exceeds the reference level Er.

The timer processing circuit 22 generates an ionic pulse GP according to the ionic pulse signal Fi from the comparator circuit 21 when the ionic current detection signal Ei continuously exceeds the reference level Er for a predetermined time $\tau$ (see FIG. 2), and supplies the ionic pulse GP as a final ionic pulse signal Gi, from which noises have been removed, to an ECU 2A.

Figure 3:
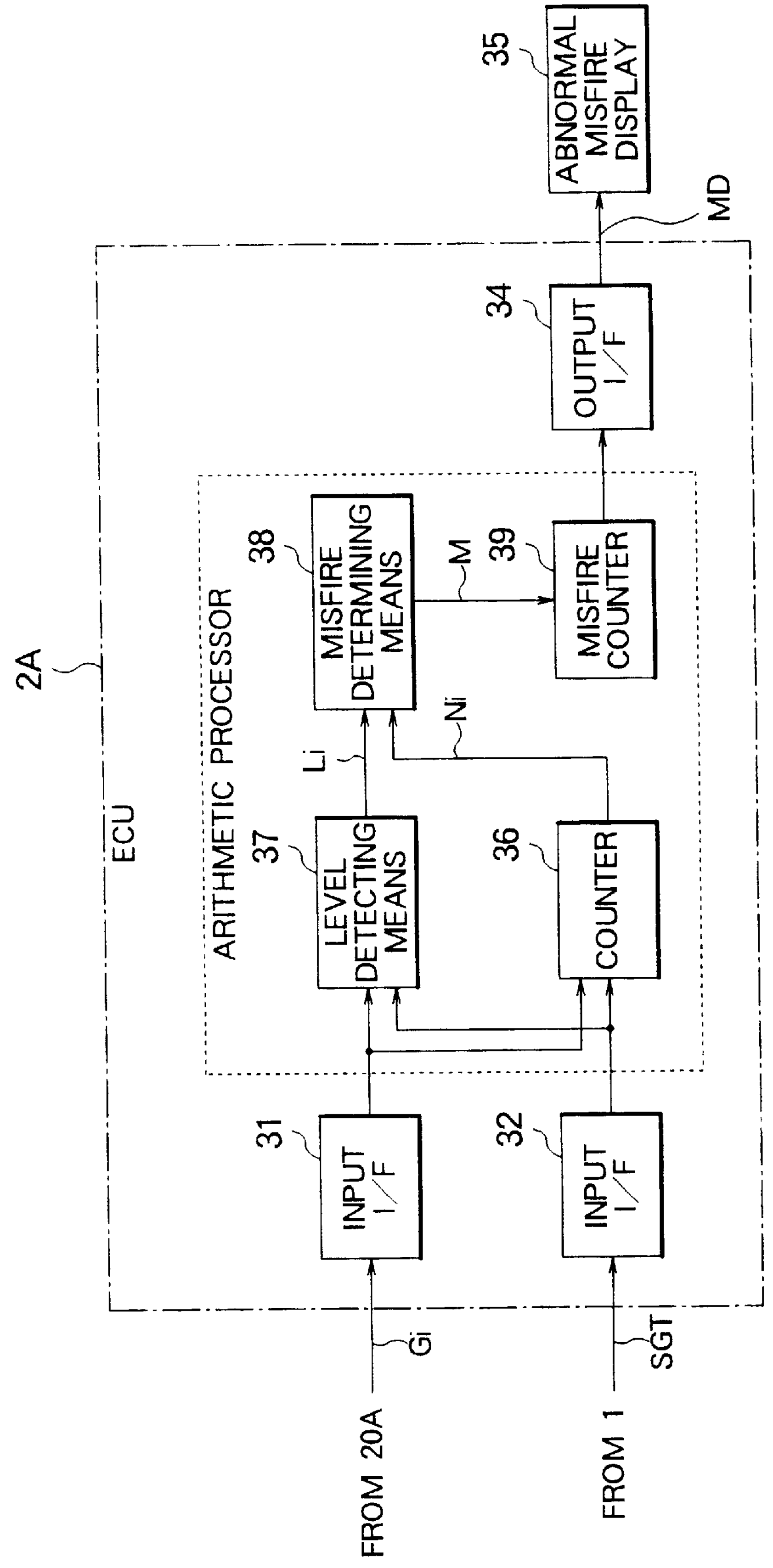
FIG. 3 is a functional block diagram illustrating a specific configuration example of an ECU shown FIG. 1.

FIG. 3 is a functional block diagram showing a specific configuration of the ECU 2A; it shows a logic configuration for judging the combustion state, i.e. a misfire, of each cylinder according to the ionic pulse signal Gi and a crank angle signal SGT.

In FIG. 3, the ECU 2A is equipped with: input interfaces 31 and 32 for capturing the ionic pulse signal Gi and the crank angle signal SGT; an arithmetic processor 33 for determining the combustion state according to the ionic pulse signal Gi and the crank angle signal SGT; and an output interface 34 for driving an abnormal misfire display 35 by issuing an abnormal misfire determination signal MD received from the arithmetic processor 33.

The arithmetic processor 33 is provided with: a counter 36 which counts a number Ni of fall edges of the ionic pulse GP between reference crank angles; level detecting circuit 37 for detecting a level Li of the ionic pulse signal Gi at a first reference crank angle B75 degrees; misfire determining circuit 38 for determining a misfire, i.e. a combustion state, according to the number Ni of fall edges and the level Li; and a misfire counter 39 which counts misfire determination signal M generated during a predetermined period of time and issues the abnormal misfire determination signal MD.

The counter 36 uses the fall edge of the crank angle signal SGT as the start timing thereof and the rise edge as the reset timing; it constitutes edge detecting circuit for detecting the fall edges, i.e. the end edges, of the ionic pulse GP in the ionic pulse signal Gi during a detection zone TD shown in FIG. 2 which ranges from a second reference crank angle B5 degrees to a first reference crank angle B75 degrees.

The misfire determining circuit 38 judges that combustion has taken place at spark plugs 8*a* to 8*d* when the number Ni of fall edges which is equal to or smaller than 1 is obtained in the detection zone TD or when the level Li of the ionic pulse signal Gi at the first reference crank angle B75 degrees is high which is indicative of the presence of the ionic pulse GP.

Further, the misfire determining circuit 38 judges that a misfire has taken place at spark plugs 8*a* to 8*d* and issues the misfire determination signal M if the number Ni of fall edges is not detected in the detection zone TD or if the level Li of the ionic pulse signal Gi at the first reference crank angle B75 degrees is low which is indicative of the absence of the ionic pulse GP.

The misfire counter 39 constructs, in cooperation with the misfire determining circuit 38, the circuit for determining the combustion state; it includes a counter for counting the number CT of control cycles and a counter for counting the number CM of the occurrences of the misfire determining signal M.

The misfire counter 39 counts the number CM of the occurrences of the misfire determining signal M encountered before a predetermined number α of control cycles is reached and it decides that the abnormal misfire state has occurred and issues the abnormal misfire determination signal MD to cause the abnormal misfire display 35 to indicate the failure if the count value CM reaches a predetermined value β.

Referring now to FIG. 1 through FIG. 3 and the flowchart of FIG. 4, the processing for the determining a misfire implemented by the first embodiment of the invention will be described.

Figure 4:
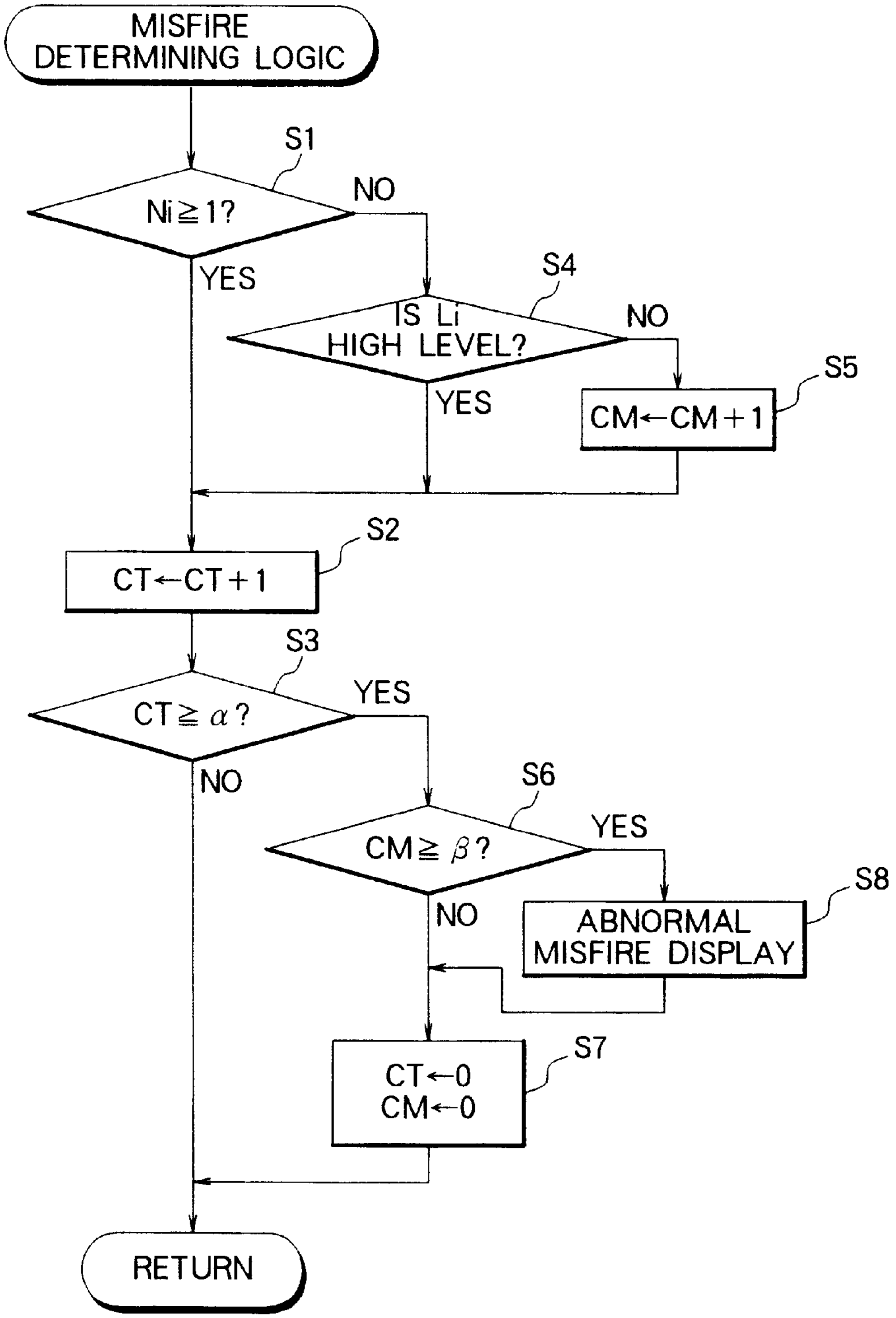
FIG. 4 is a flowchart illustrating the misfire determining processing implemented by the first embodiment of the invention.

FIG. 4 shows the flowchart illustrative of the operations of the misfire determining circuit 38 and the misfire counter 39. It is assumed that the count values CT and CM in the counters incorporated in the misfire counter 39 have been reset, i.e. cleared to zero, in advance.

The general ignition control or the like conducted by the ECU 2A is the same as that previously described, so that it will be omitted; the description will be given only to the processing based on the ionic pulse signal Gi, which is different from that described previously.

The comparator circuit 21 in the pulse generating circuit 20A compares the ionic current detection signal Ei with the reference level Er and outputs the ionic pulse signal Fi which stays at high level for a period of time in which Ei>Er.

The timer processing circuit 22 generates the ionic pulse GP which becomes at high level when the period of time in which the ionic pulse signal Fi is at high level continues for the predetermined time τ.

Thus, the ionic pulse signal Gi from which the noise signal En produced at the time of energizing or de-energizing an ignition coil 4 has been removed is supplied to the ECU 2A.

The ECU 2A also receives the crank angle signal SGT in addition to the ionic pulse signal Gi.

In the ECU 2A, the counter 36 in the arithmetic processor 33 counts the number Ni of fall edges of the ionic pulse GP detected in a detection zone TD ranging from the second reference position B5 degrees of a cylinder under control, e.g. cylinder #1, to the first reference position B75 degrees of the subsequent cylinder to be controlled, e.g. cylinder #3.

The level detecting circuit 37 detects the level Li of the ionic pulse signal Gi from the cylinder under control, namely, cylinder #1, at the first reference position B75 degrees of the subsequent cylinder to be controlled, namely, cylinder #3.

In FIG. 4, the misfire determining circuit 38 judges whether the ionic pulse GP is present in the detection zone TD according to whether the number Ni of the fall edges is 1 or more (step 1).

If any fall edge of the ionic pulse GP has been found in the detection zone TD, then it is determined in step S1 that Ni≧1, i.e. YES; therefore, it is determined that combustion has taken place at the cylinder under control, namely, cylinder #1, and the misfire counter 39 increments the number CT of control cycles (step S2).

The misfire counter 39 then determines whether the number CT of control cycles has reached the predetermined number α of cycles for judgment (step S3); if it decides that CT<α, i.e. NO, then it returns and repeats the determining logic shown in FIG. 4.

If it is determined in step Si that Ni<1, i.e. NO, then the misfire determining circuit 38 judges whether the level Li of the ionic pulse signal Gi at the first reference position B75 degrees of the next cylinder to be controlled, namely, cylinder #3 (step S4).

If the level Li of the ionic pulse signal Gi is determined to be high, i.e. YES, then it is determined that the combustion has taken place at the cylinder under control, namely, cylinder #1, and the misfire determining circuit 38 proceeds to step S2 wherein it increments the number CT of control cycles.

If the level Li of the ionic pulse signal Gi is determined to be low, i.e. NO, then it is determined that a misfire has taken place at the cylinder under control, namely, cylinder #1, and the misfire determining circuit 38 issues the misfire determination signal M.

The misfire counter 39 increments the misfire count value CM in step S5 before proceeding to step S2 wherein it increments the number CT of control cycles.

When the number CT of control cycles reaches the predetermined number α of cycles as step S2 is implemented repeatedly, it is determined in step S3 that CT≧α, i.e. YES.

At this time, the misfire counter 39 judges in step S6 whether the count value CM of misfire determinations has reached the predetermined value β, and if it decides that CM<β, i.e. NO, then it judges that the cylinder under control, namely, cylinder #1, has not developed the abnormal misfire state and clears the count values CT and CM to zero in step S7 before returning to step S1.

If the misfire counter 39 determines in step S6 that CM≧β, i.e. YES, then it drives the abnormal misfire display 35 by issuing the abnormal misfire determination signal MD in step S8 and proceeds to step S7 wherein it resets the counter values.

After that, the abnormal misfire display is continued until an operator takes proper corrective action to clear the abnormal misfire display 35.

Thus, the combustion state, i.e. misfire, can be easily and positively detected by employing the simple timer processing circuit 22 in the pulse generating circuit 20A and by employing the simple determination logic in the ECU 2A to detect the number Ni of fall edges of the ionic pulse GP in the detection zone TD and the level Li of the ionic pulse signal Gi at the first reference crank angle B75 degrees.

Hence, no increase will result in cost or in the load on the entire circuitry and the arithmetic processor 33 in the ECU 2A.

Moreover, since the signal-to-noise ratio of the ionic pulse signal Gi is improved because of the removal of the noise signal En, the ECU 2A is able to determine the combustion state with high reliability according to highly accurate ionic pulse signal Gi without adding to the load on the arithmetic processor.

In addition, the abnormal misfire state can be judged with high reliability since the misfire counter 39 which works in cooperation with the misfire determining circuit 38 statistically processes a plurality of misfire determination results to judge the abnormal misfire state.

It is known that the output level of the ionic current detection signal Ei is normally especially high in the first half of the combustion and expansion stroke of the cylinder under control, i.e. in the range from the compression upper dead center to A90 degrees (in the range from the compression upper dead center to 90-degree rotation).

The first reference crank angle B75 degrees of the next cylinder to be controlled corresponds to A105 degrees of the cylinder under control.

Thus, the detection zone TD includes the range from the compression upper dead center to A90 degrees wherein the output level of the ionic current detection signal Ei is high; therefore, the combustion state or a misfire can be effectively determined by referring to the ionic pulse signal Gi in the aforesaid detection zone TD.

Obviously, the ECU 2A is able to correct various control parameters including the ignition timing in accordance with the combustion state determination results.

In the first embodiment described above, the operational waveforms observed when normal combustion takes place as shown in FIG. 2; however, various other combustion states can also be determined properly.

Figure 5:
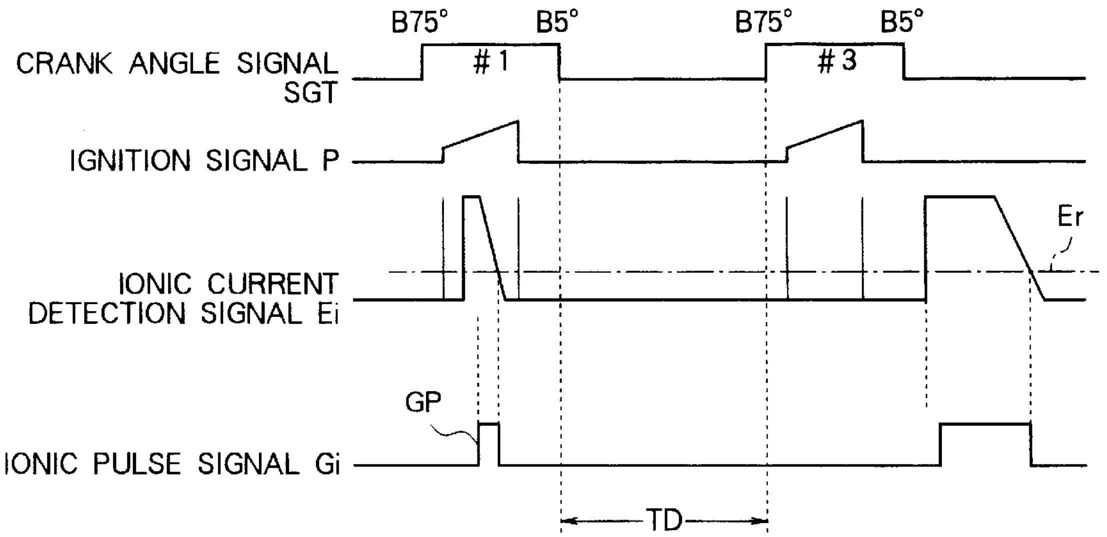
FIG. 5 is a timing chart for describing the combustion state determining operation performed by the first embodiment of the invention when pre-ignition takes place.

For instance, FIG. 5 is a timing chart illustrating the voltage waveforms observed when a pre-ignition or the like occurs in cylinder #1; the ionic current detection signal Ei is generated before the detection zone TD.

Thus, the ionic current detection signal Ei which is different from the one observed when normal combustion takes place and which is generated before the crank angle position B10 degrees of cylinder #1 is generated not only when the ionic current flows due to the pre-ignition but also due to other causes such as the leakage current attributable to the fuel injection taking place during the compression stroke of the spark plugs 8*a* to 8*d* in an intracylindrical injection type internal-combustion engine.

In such a case, the ionic pulse GP is generated in the range of the first reference crank angle B75 degrees to the second reference crank angle B degree of cylinder #1, whereas no ionic pulse GP appears in the detection zone TD; therefore, the misfire determining circuit 38 does not determine the combustion state of cylinder #1.

Figure 6:
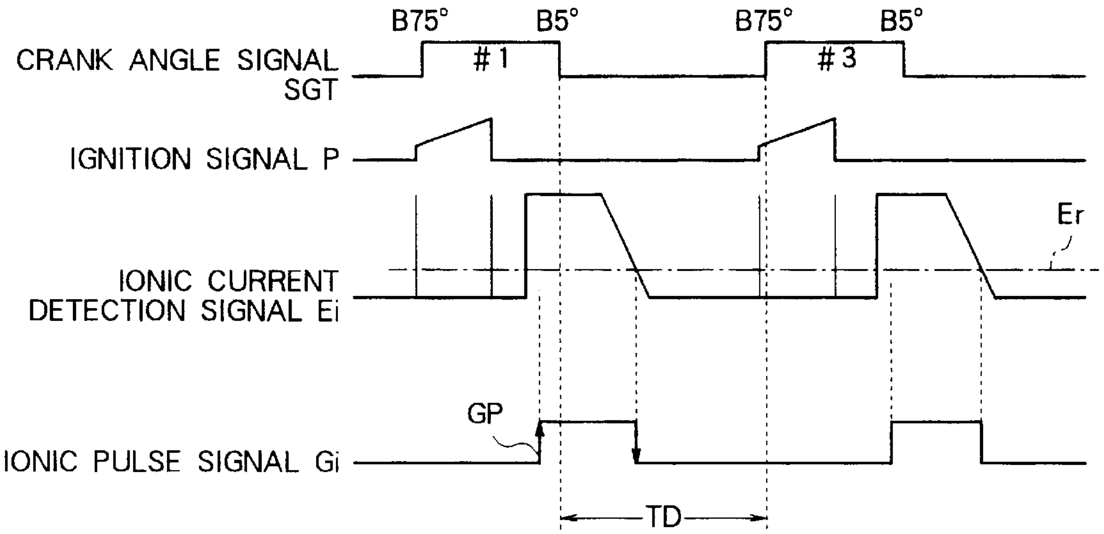
FIG. 6 is a timing chart for describing the combustion state determining operation performed by the first embodiment of the invention when spark advance ignition takes place.

As shown in FIG. 6, for example, when the ignition timing is advanced, the ionic pulse GP rises before the second reference crank angle B5 degrees.

In such a case, the fall edge, i.e. the end edge, of the ionic pulse GP is detected in the detection zone TD, so that the misfire determining circuit 38 is able to judge that the combustion has taken place at cylinder #1, thus eliminating the possibility of misjudgement of a misfire.

Figure 7:
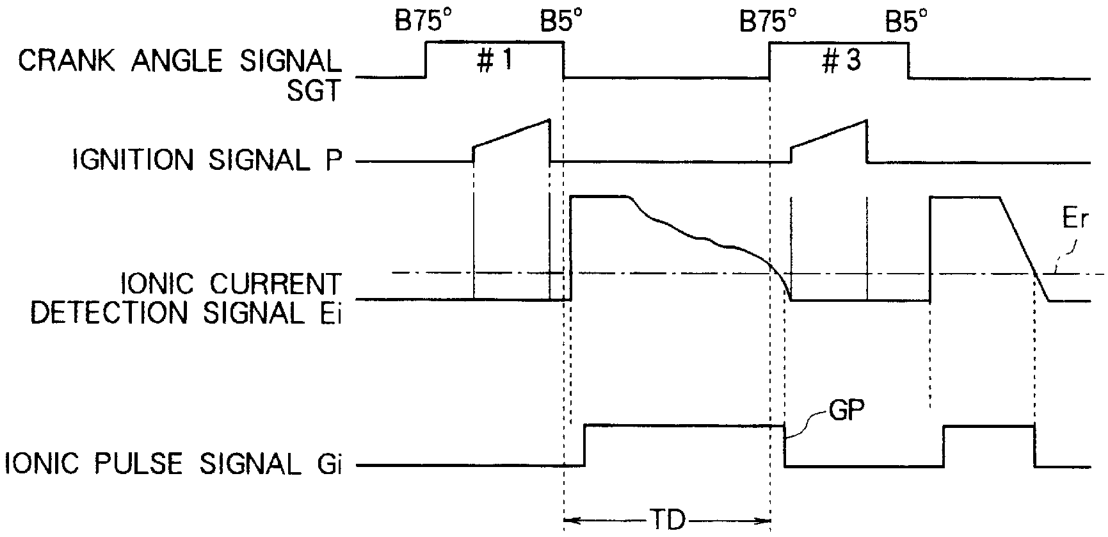
FIG. 7 is a timing chart for describing the combustion state determining operation performed by the first embodiment of the invention when combustion is prolonged.

Further, as shown in FIG. 7, for example, if combustion is prolonged, the ionic current continues to flow. As a result, the ionic pulse GP does not fall until after the first reference position B75 degrees of cylinder #3.

In such a case, although the fall edge of the ionic pulse GP cannot be detected in the detection zone TD, the level Li of the ionic pulse signal Gi at the first reference position B75 degrees of cylinder #3 is high, so that the misfire determining circuit 38 is able to judge that ions have been generated, i.e. the combustion has taken place, at cylinder #1.

In general, the prolonged combustion illustrated in FIG. 7 happens when the ignition timing is set to be delayed; although it is not a very good combustion state, it is not regarded as a misfire.

Second Embodiment

In the first embodiment, the detection zone TD has been defined as the range from the second reference position B5 degrees of the cylinder under control to the first reference position B75 degrees of the next cylinder to be controlled in order to distinguish the ionic pulse GP of one line for each cylinder, considering a case where the same single ionic current detecting circuit is shared by a plurality of cylinders of the internal-combustion engine.

If, however, a plurality of ionic current detecting circuit are provided for the cylinders and the ionic pulse GP can be obtained through a separate signal line for each cylinder, then the end timing of the detection zone TD may be set to the second reference crank angle B5 degrees of the subsequent cylinder to be controlled so as to expand the detection zone TD.

As in the case of cylinder #1, shown in FIG. 5, for example, even if pre-ignition occurs in the latter half of the compression stroke of cylinder #3, i.e. in the latter half of the combustion and expansion stroke of cylinder #1, the ionic pulse generated from this pre-ignition is detected by another ionic current detector, thus exerting no adverse influence on the detection of the ionic pulse GP of cylinder #1.

Third Embodiment

In the foregoing first embodiment, the first reference crank angle which provides the arithmetic operation reference of control parameters for each cylinder has been set to B75 degrees, while the second reference crank angle which corresponds to the vicinity of the compression upper dead center of each cylinder has been set to B5 degrees; however, the first reference crank angle may alternatively be set to a value in the range of B90 degrees to B60 degrees, and the second reference crank angle to a value in the range of B10 degrees to A10 degrees.

Within the permissible ranges mentioned above, the control of ignition timing and the detection of the combustion state can be smoothly carried out, providing the same operation and advantage as those described previously.

Fourth Embodiment

In the foregoing first embodiment, the case where the high voltage for ignition is distributed to each cylinder has been taken as an example; however, it is obvious that the high voltage may be replaced by low voltage, and it is also needless to say that the present invention can also be applied to group ignition wherein each group of cylinders is ignited.

What is claimed is:

1. A combustion state detecting apparatus for an internal-combustion engine, comprising:

an ignition coil for generating high voltage for ignition;

a spark plug for igniting a fuel-air mixture in a cylinder of the internal-combustion engine by discharging under the application of the high voltage for ignition;

an ionic current detecting circuit which detects, as an ionic current detection signal, the ionic current corresponding to the quantity of ions produced in the cylinder immediately after the combustion of the fuel-air mixture;

a pulse generating circuit which waveform-shapes the ionic current detection signal into an ionic pulse signal;

a crank angle sensor which generates a crank angle signal indicative of first and second reference crank angles of the cylinder; and an ECU which generates an ignition signal for energizing or de-energizing the ignition coil according to the crank angle signal and which detects the combustion state in the spark plug according to the ionic pulse signal;

wherein the first reference crank angle corresponds to a control reference for controlling the ignition of the cylinder, the second reference crank angle corresponds to the vicinity of the compression upper dead center of the cylinder, and the ECU includes;

edge detecting circuit for detecting an end edge of an ionic pulse included in the ionic pulse signal in the detection zone ranging from the second reference crank angle to the first reference crank angle, level detecting circuit for detecting the level of the ionic pulse signal at the first reference crank angle, and determining circuit which determines the combustion state of the internal-combustion engine according to the detection results received from the edge detecting means and the level detecting means.

2. A combustion state detecting apparatus for an internal-combustion engine according to claim 1, wherein the determining means:

determines that combustion has taken place at the spark plug when the end edge has been detected in the detection zone, or when the level of the ionic pulse signal at the first reference crank angle indicates a first level indicative of the presence of an ionic pulse; and determines that a misfire has taken place at the spark plug if the end edge has not been detected in the detection zone and the level of the ionic pulse signal at the first reference crank angle is a second level indicative of the absence of the ionic pulse.

3. A combustion state detecting apparatus for an internal-combustion engine according to claim 2, wherein the determining circuit includes:

a counter which counts the number of times misfires have been determined until a predetermined number of control cycles is reached; and decides that an abnormal misfire state has occurred when the count by the counter reaches a predetermined value and displays the failure.

4. A combustion state detecting apparatus for an internal-combustion engine according to claim 1, wherein the pulse generating circuit includes a comparator circuit for comparing an ionic current detection signal with a reference level, and a timer processing circuit for removing noises from the ionic current detection signal.

5. A combustion state detecting apparatus for an internal-combustion engine according to claim 1, wherein:

the first reference crank angle is set to a value lying between B90 degrees and B60 degrees of each cylinder; and the second reference crank angle is set to a value lying between B10 degrees and A10 degrees of each cylinder.

* * * * *